(12) United States Patent
Hageman

(10) Patent No.: US 10,662,854 B2
(45) Date of Patent: May 26, 2020

(54) EXHAUST SEALING JOINT

(71) Applicant: EGC ENTERPRISES, INC., Chardon, OH (US)

(72) Inventor: David C. Hageman, Chagrin Falls, OH (US)

(73) Assignee: EGC ENTERPRISES, INC., Chardon, OH (US)

( * ) Notice: Subject to any disclaimer, the term of this patent is extended or adjusted under 35 U.S.C. 154(b) by 107 days.

(21) Appl. No.: 15/728,780

(22) Filed: Oct. 10, 2017

(65) Prior Publication Data

US 2018/0128152 A1     May 10, 2018

Related U.S. Application Data

(60) Provisional application No. 62/406,072, filed on Oct. 10, 2016.

(51) Int. Cl.
| | |
|---|---|
| *F01N 13/18* | (2010.01) |
| *F01N 13/10* | (2010.01) |
| *F16L 21/03* | (2006.01) |
| *F16L 27/12* | (2006.01) |
| *F16L 59/14* | (2006.01) |
| *F16L 57/04* | (2006.01) |

(52) U.S. Cl.
CPC ......... *F01N 13/1827* (2013.01); *F01N 13/10* (2013.01); *F01N 13/1844* (2013.01); *F01N 2340/00* (2013.01); *F01N 2450/18* (2013.01); *F16L 21/03* (2013.01); *F16L 27/125* (2013.01); *F16L 57/04* (2013.01); *F16L 59/145* (2013.01)

(58) Field of Classification Search
CPC ........ F16J 15/20; F16J 15/28; F01N 13/1827; F01N 3/2857; F16L 27/12
See application file for complete search history.

(56) References Cited

U.S. PATENT DOCUMENTS

| | | | | |
|---|---|---|---|---|
| 2,521,692 | A * | 9/1950 | Costello | F16J 15/28 |
| | | | | 277/530 |
| 3,951,418 | A * | 4/1976 | Dryer | F16J 15/14 |
| | | | | 277/619 |
| 4,915,397 | A * | 4/1990 | Nicholson | F16J 15/0887 |
| | | | | 277/645 |
| 6,220,605 | B1 | 4/2001 | Becker, Jr. | |
| 6,302,402 | B1 * | 10/2001 | Rynders | F16J 15/0806 |
| | | | | 277/530 |
| 6,446,978 | B1 | 9/2002 | Halling et al. | |
| 7,204,492 | B2 * | 4/2007 | Hoyes | F16J 15/125 |
| | | | | 277/610 |
| 7,328,685 | B2 * | 2/2008 | Mockenhaupt | F01N 13/10 |
| | | | | 123/315 |
| 7,837,233 | B2 | 11/2010 | Johnston et al. | |

(Continued)

*Primary Examiner* — Nicholas L Foster
(74) *Attorney, Agent, or Firm* — Tarolli, Sundheim, Covell & Tummino LLP

(57) ABSTRACT

A sealing device for an exhaust manifold in a vehicle having longitudinally overlapping first and second components separated by a gap includes a plurality of backing rings for positioning in the gap between the first and second components. An intumescent mat is positioned between and abuts the backing rings. A retainer connected to the first and second components covers the gap to prevent the backing rings and mat from exiting the gap while allowing for relative longitudinal and rotational movement between the first and second components.

24 Claims, 11 Drawing Sheets

(56) References Cited

U.S. PATENT DOCUMENTS

| | | | | |
|---|---|---|---|---|
| 8,104,273 | B2* | 1/2012 | Barrieu | F01N 13/102 |
| | | | | 29/890.08 |
| 8,876,118 | B2* | 11/2014 | Hoyes | F16J 15/125 |
| | | | | 277/610 |
| 10,330,200 | B2* | 6/2019 | Zhao | F16J 15/068 |
| 2003/0132579 | A1* | 7/2003 | Hoyes | F16J 15/125 |
| | | | | 277/610 |
| 2005/0006858 | A1* | 1/2005 | Hoyes | F16J 15/125 |
| | | | | 277/628 |
| 2005/0023769 | A1 | 2/2005 | Halling | |
| 2006/0272321 | A1* | 12/2006 | Mockenhaupt | F01N 13/10 |
| | | | | 60/323 |
| 2009/0266065 | A1* | 10/2009 | Barrieu | F01N 13/102 |
| | | | | 60/323 |
| 2010/0066034 | A1* | 3/2010 | Li | F16J 15/18 |
| | | | | 277/626 |
| 2012/0160572 | A1* | 6/2012 | Ayers | F16J 15/18 |
| | | | | 175/371 |
| 2016/0348565 | A1* | 12/2016 | Jones | F01N 13/1827 |

* cited by examiner

EXHAUST SEALING JOINT

RELATED APPLICATIONS

This application claims the benefit of U.S. Provisional Application Ser. No. 62/406,072, the entirety of which is incorporated herein by reference.

TECHNICAL FIELD

The present invention relates generally to exhaust systems, and specifically to an internal slip joint sealing device for an exhaust system.

SUMMARY

In one example, a sealing device for an exhaust manifold in a vehicle having longitudinally overlapping first and second components separated by a gap includes a plurality of backing rings for positioning in the gap between the first and second components. An intumescent mat is positioned between and abuts the backing rings. A retainer connected to the first and second components covers the gap to prevent the backing rings and mat from exiting the gap while allowing for relative longitudinal and rotational movement between the first and second components.

In another example, a sealing device for an exhaust manifold in a vehicle having mating first and second components includes a plurality of backing rings for positioning in an opening in the first component and are biased into engagement with the first and second components. An intumescent, compressed mat is positioned between and abuts the backing rings. A retainer extends around an end of the first component defining the opening and forms a snap-fit connection with an end of the second component. A sealing member positioned within the retainer abuts one of the backing rings for preventing soot from passing through the gap. The device allows for relative longitudinal and rotational movement between the first and second components.

Other objects and advantages and a fuller understanding of the invention will be had from the following detailed description and the accompanying drawings.

DETAILED DESCRIPTION

The present invention relates generally to exhaust systems, and specifically to an internal slip joint sealing device for an exhaust system. FIGS. 1A-3 illustrate an example exhaust sealing device 20 in accordance with the invention. In one example, the sealing device 20 is used to seal a connection between vehicle manifold components, such as a female manifold 30 and male manifold 50. Other manifold connections and/or other devices than shown are contemplated.

Figure 1A:
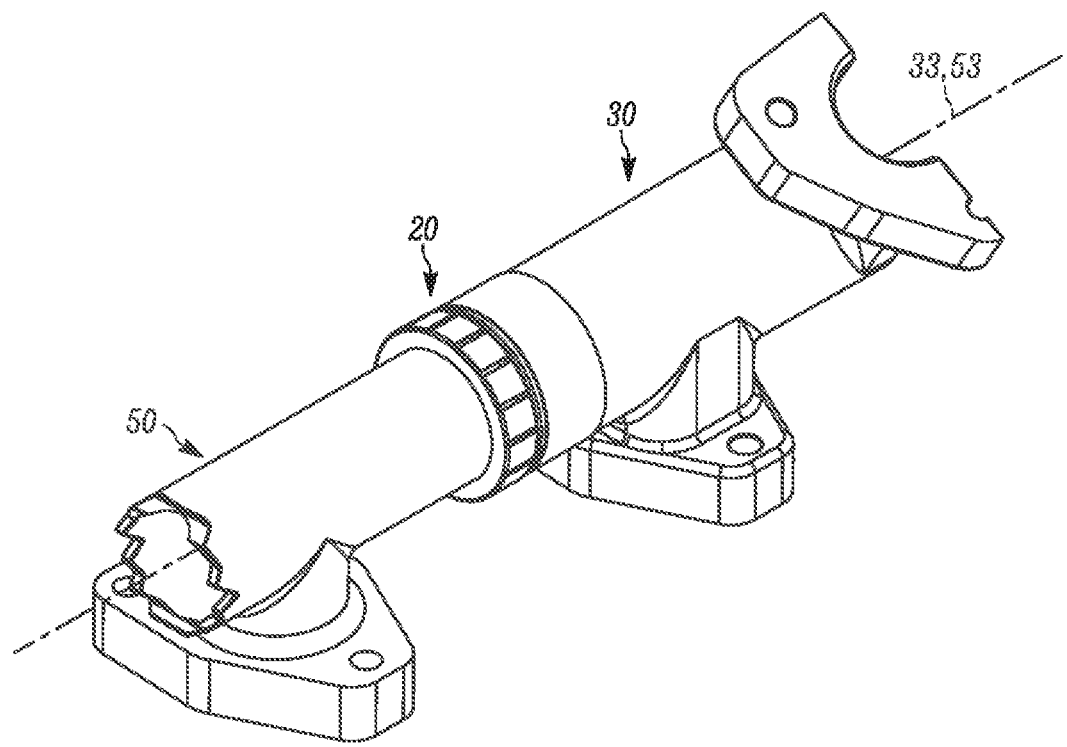
FIGS. 1A-1B are schematic illustrations of first and second manifold components connected by a sealing device in accordance with the present invention.
Figure 1B:
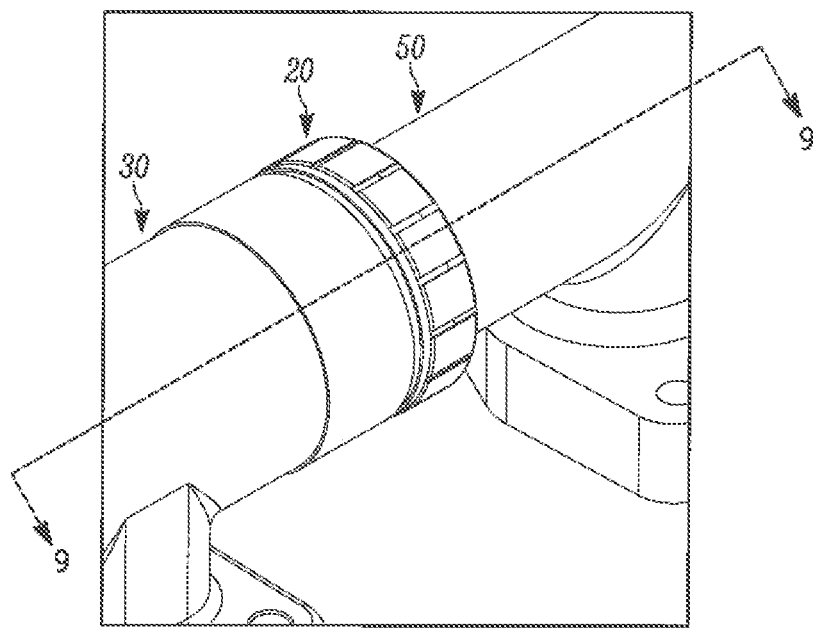
Figure 2:
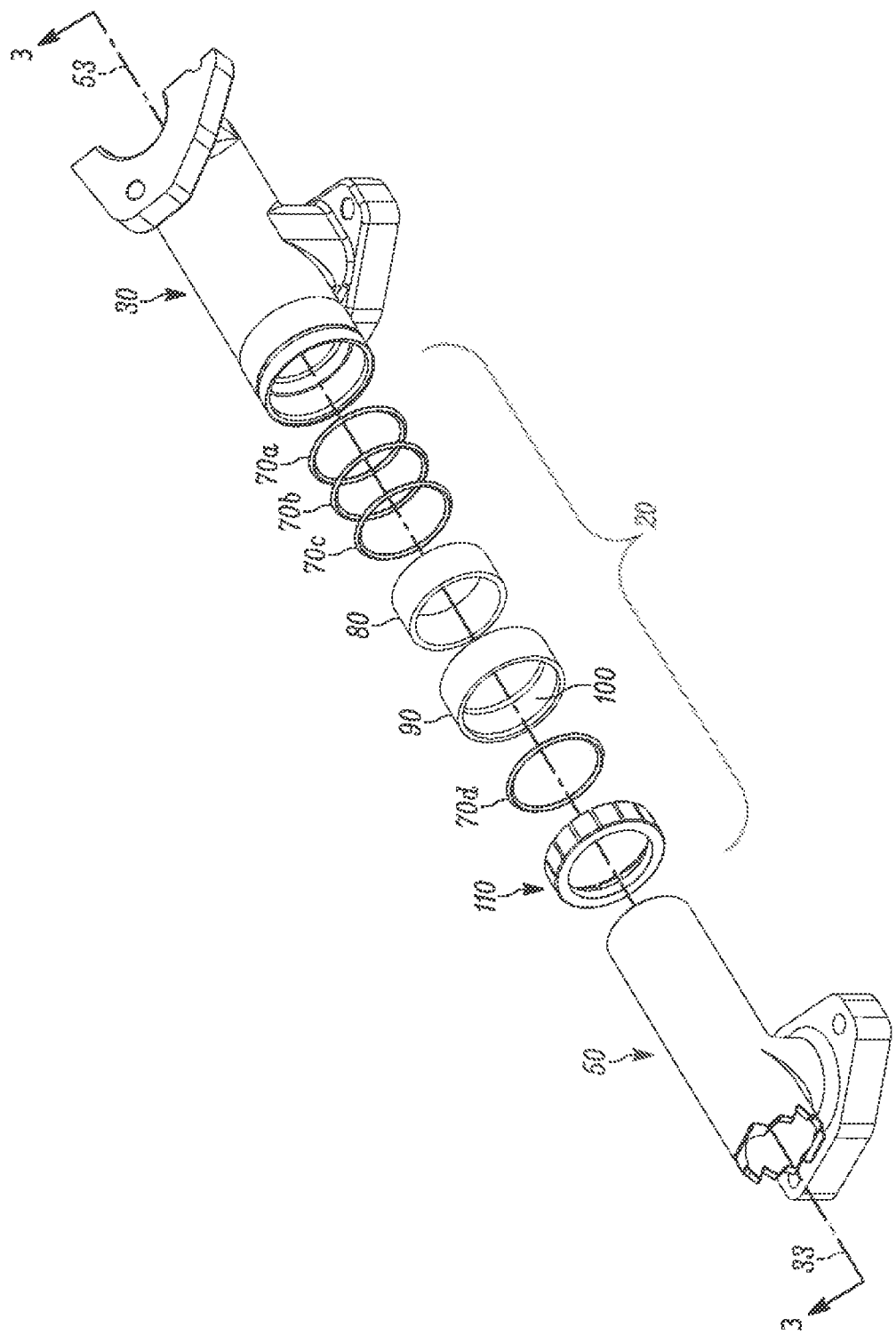
FIG. 2 is an exploded view of the components in FIG. 1A.
Figure 3:
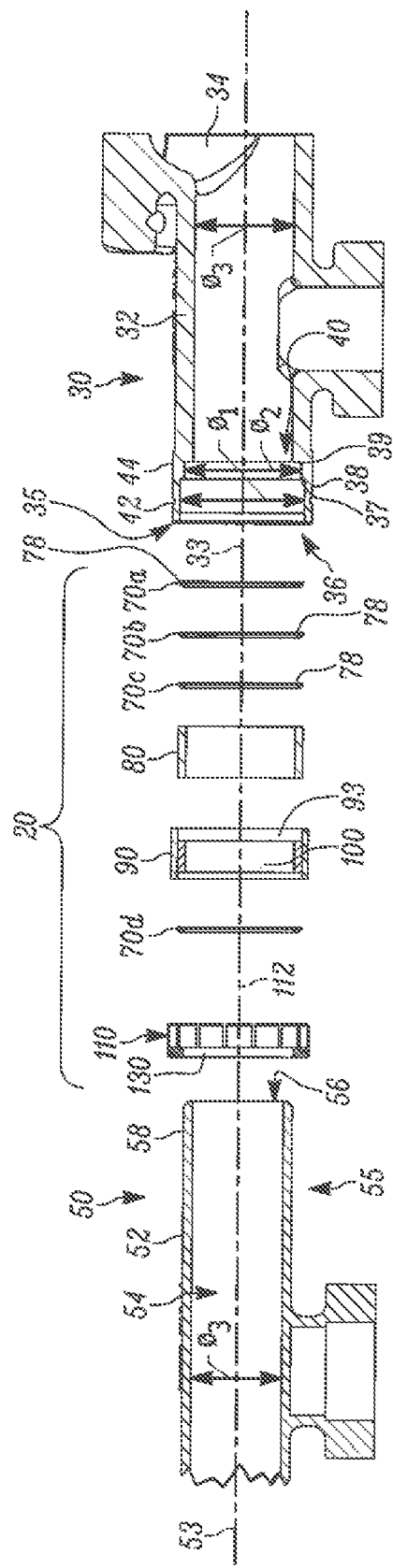
FIG. 3 is a longitudinal section view of FIG. 2 taken along line 3-3.

Referring to FIG. 3, the female manifold 30 includes a body 32 formed of a rigid material, e.g., aluminum, cast iron or polymer(s) and having an outer surface 44. The portion of the body 32 shown is T-shaped and extends generally along a centerline 33. A passage 34 extends entirely through the body 32, with a portion of the passage 34 extending along the centerline 33. The passage 34 terminates at one end 35 of the body 32 at a round/circular opening 36.

The opening 36 includes a first portion 38 extending inward from the end 35 of the body 32 to an axial end surface 37. A second portion 40 extends inward from the first portion 38 to an axial end surface 39 within the body 32. The diameter $\Phi_1$, $\Phi_2$ of each portion 38, 40, respectively, is greater than the diameter $\Phi_3$ of the passage 34. An annular channel or recess 42 is formed in the outer surface 44. In one example, the recess 42 is rectangular in cross-section and encircles the centerline 33. The recess 42 is positioned radially outward of the opening 36.

The male manifold 50 includes a body 52 formed of a rigid material, e.g., aluminum, cast iron or polymer(s), and having an outer surface 58. The portion of the body 52 shown is T-shaped and extends generally along a centerline 53. A passage 54 extends through the body 52, with a portion of the passage 54 extending along the centerline 53. The passage 54 terminates at one end 55 of the body 52 at a round/circular opening 56. The opening 56 and the passage 54 have the same diameter $\Phi_3$. The passages 34, 54 in the respective manifolds 30, 50 have substantially equal diameters.

As shown in FIG. 3, the sealing device 20 includes a series of backing rings 70, a mat 100, a retainer 110, and a sealing member 130. Although four backing rings 70 are illustrated, it will be appreciated that the sealing device 20 can have more or fewer backing rings. In any case, at least one backing ring 70 is provided on each side of the mat 100.

Figure 4:
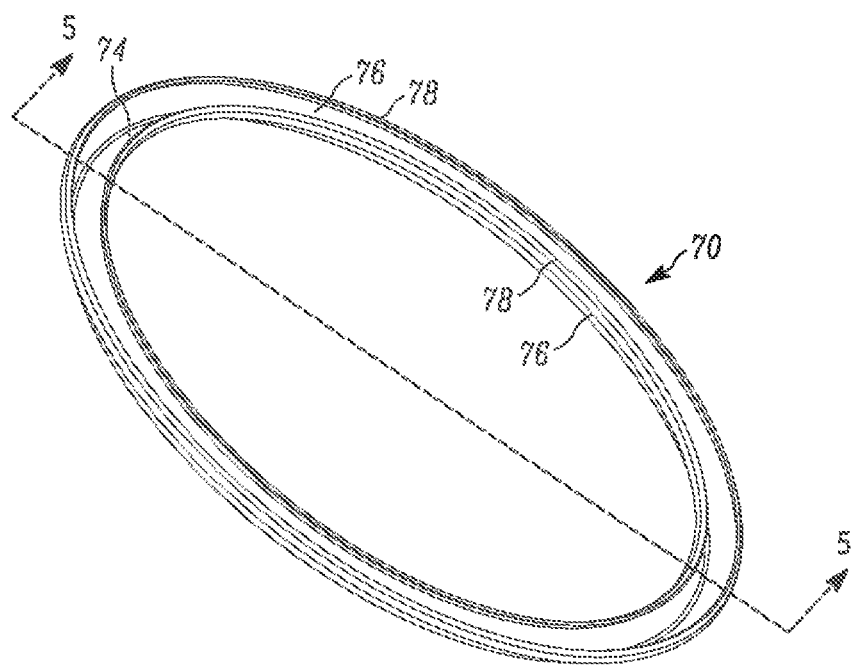
FIG. 4 is an isometric view of a backing ring of the sealing device of FIG. 1.
Figure 5:
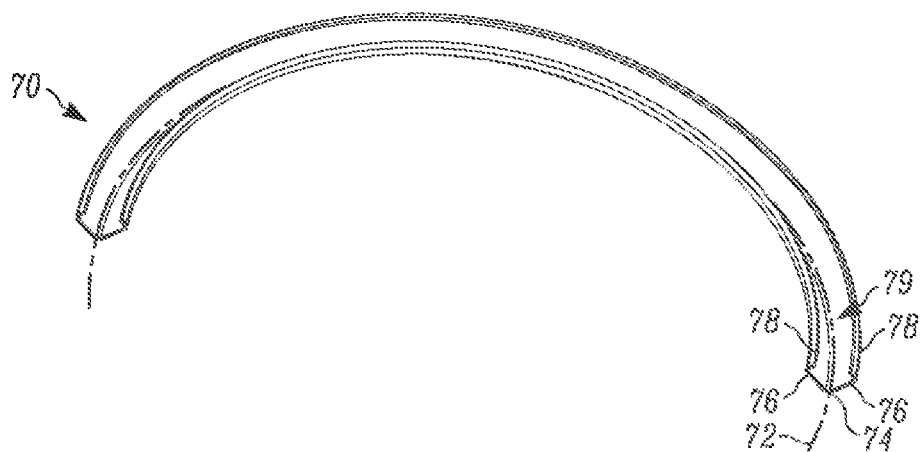
FIG. 5 is section view of the backing ring of FIG. 4 taken along line 5-5.

FIGS. 4-5 illustrate that each backing ring 70 extends along an annular centerline 72 and has a generally V-shaped cross-section about the centerline. A base 74 extends parallel to the centerline 72. A pair of legs 76 extends from the base 74 and outward relative to one another on opposite sides of the centerline 72. A curved projection 78 extends from each leg 76 inward toward one another. The base 74, legs 76, and projections 78 cooperate to define a passage 79 in the ring 70.

Figure 6:
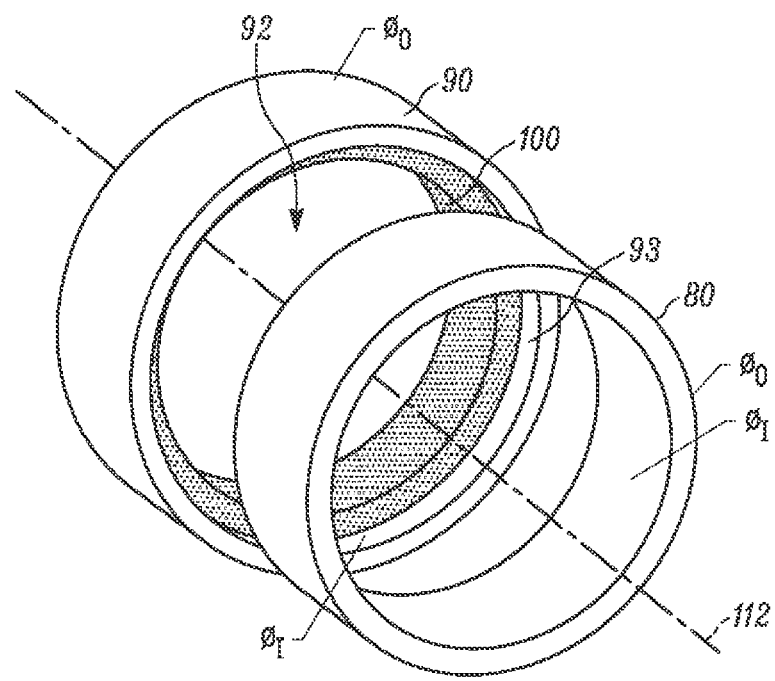
FIG. 6 is an isometric view of installation rings used to connect the sealing device to the manifold components.

Referring to FIG. 6, the mat 100 is ring-shaped and made from an intumescent material, e.g., woven or braided ceramic fiber with binders (less than about 10-15%). The mat 100 can alternatively be formed from a dense, resilient braided ceramic fiber. The mat 100 can be highly resistant to chemicals and/or oxidation and withstand temperatures in excess of 1000° F. The mat 100 can be round or square braided and have a density of about 300 kg/m³ to about 600 kg/m³. The mat 100 can have a breaking strength of about 50 N to about 500 N, depending on the particular application.

Additional components can be added to the mat 100 to enhance both its mechanical stability and density for sealing performance. To this end, a lower organic content in the mat 100 can result in improved performance due to reduced weight loss during operation of the device 20. The mat 100 provides thermal stability to the device 20 with a continuous use temperature of about 800° C. and can expand with increasing relative thickness when first exposed to temperatures in excess of about 325° C. The mat 100 can also be coated with a high temperature coating to meet design criterion.

The mat 100 is configured to function as a seal of both high temperature exhaust gas as well as fuel in piston engine exhaust systems, depending on the environment in which the manifolds 30, 50 are used. The mat 100 is capable of filtering particulates, e.g., diesel exhausts and other soot-containing systems, and provides thermal insulation along the interface between the manifolds 30, 50.

Referring to FIG. 6, a pair of installation tubes 80, 90 help secure the device 20 to the manifolds 30, 50. The tube 80 is cylindrical and has an outer diameter $\Phi_O$ and an inner diameter $\Phi_I$. The tube 80 is sized to slide into the first portion 38 of the opening 36 in the female manifold 30 while having an outer diameter $\Phi_O$ greater than the diameter $\Phi_2$ of the second portion 40.

The tube 90 is cylindrical and has an outer diameter $\Phi_O$ and an inner diameter $\Phi_I$. The outer diameter $\Phi_O$ of the tube 80 is less than the inner diameter $\Phi_I$ of the tube 90. The tube 90 includes an inner surface 93 defining an interior space 92 for receiving the mat 100 in a concentric manner. To this end, the mat 100 abuts the inner surface 93 of the tube 90.

Figure 7:
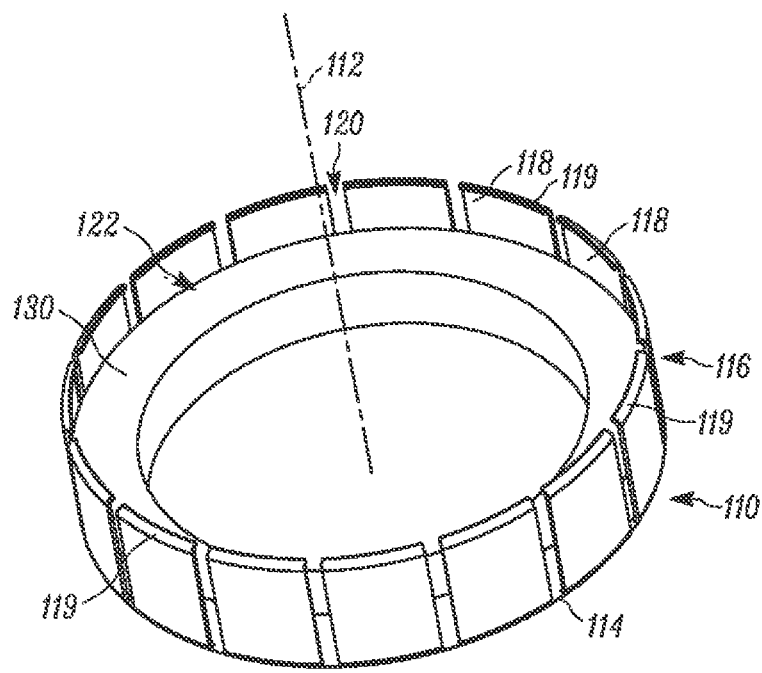
FIG. 7 is an isometric view of a retainer and sealing element of the sealing device of FIG. 1.

Referring to FIG. 7, the retainer 110 extends generally along a centerline 112 and includes a base 114 and a skirt 116. The base 114 is ring-shaped and extends around the centerline 112. The skirt 116 extends from the base 114 and includes a series of projections 118 circumferentially spaced apart from one another by gaps 120. Each projection 118 terminates at a lip 119 extending radially inwards towards the centerline 112. As shown, the projections 118 are rectangular, although the projections could have other shapes defined by the shape of the gaps 120. The skirt 116 can have more or fewer projections 118 than the amount shown in FIG. 7. In any case, the configuration of the projections 118 and gaps 120 allow the skirt 116 to be flexible, namely, the projections are movable relative to one another and relative to the base 114 in the manner shown generally by the arrow R.

The skirt 116 extends around the centerline 112 and cooperates with the base 114 to form an interior space or chamber 122. The interior space 122 is sized to receive the sealing member 130, which abuts the base 114 and the skirt 116. As shown, the sealing member 130 is ring-shaped and can be formed out of the same material(s) as the mat 100, e.g., an intumescent, woven or braided flexible ceramic including binders (less than about 10-15%). The retainer 110 is formed from a heat resistant, durable material, such as stainless steel. Both the sealing member 130 and retainer 110 are constructed to withstand temperatures in excess of 1000° F.

To assemble the device 20 and interconnect the manifolds 30, 50 (FIGS. 8A-10), the backing rings 70a-70c are positioned within the first portion 38 of the body 32. The rings 70a-70c are oriented in the same manner such that the projections 78 all point in the same direction (generally to the left as shown in FIG. 9). The rings 70a-70c are stacked atop one another and can be further pressed together by hand or by the installation tube 80 (not shown). More specifically, the tube 80 can be inserted into the first portion 38 and moved towards the second portion 40 to compact the rings 70a-70c against one another and against the axial end surface 37. In any case, compressing the stack of rings 70a-70c causes the legs 76 of each ring to spread apart from one another beyond their natural/stress-free state by elastically deforming. This, in turn, causes the legs 76 and base 74 of the ring 70a to extend into the passage 79 of the ring 70b. The legs 76 and base 74 of the ring 70b extend into the passage 79 of the ring 70c.

Figure 8A:
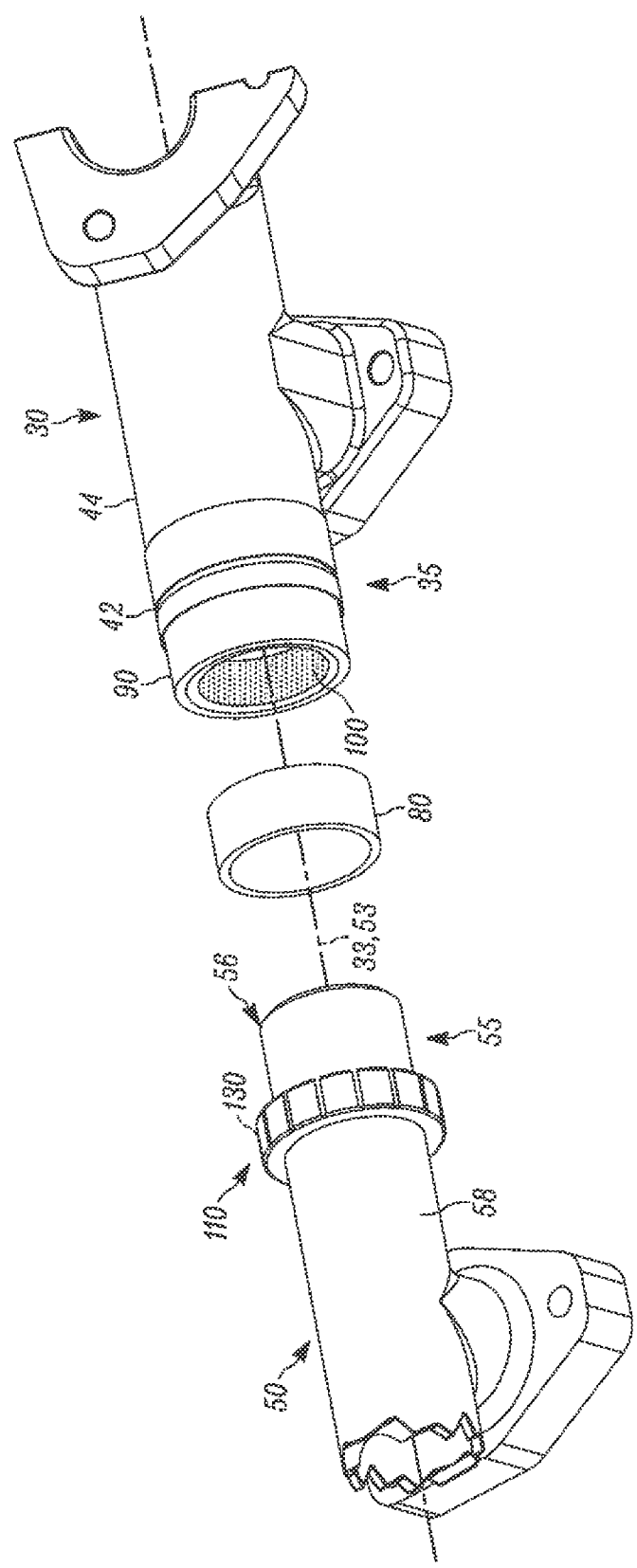
FIGS. 8A-8B are isometric views of different assembly stages of the sealing device.
Figure 8B:
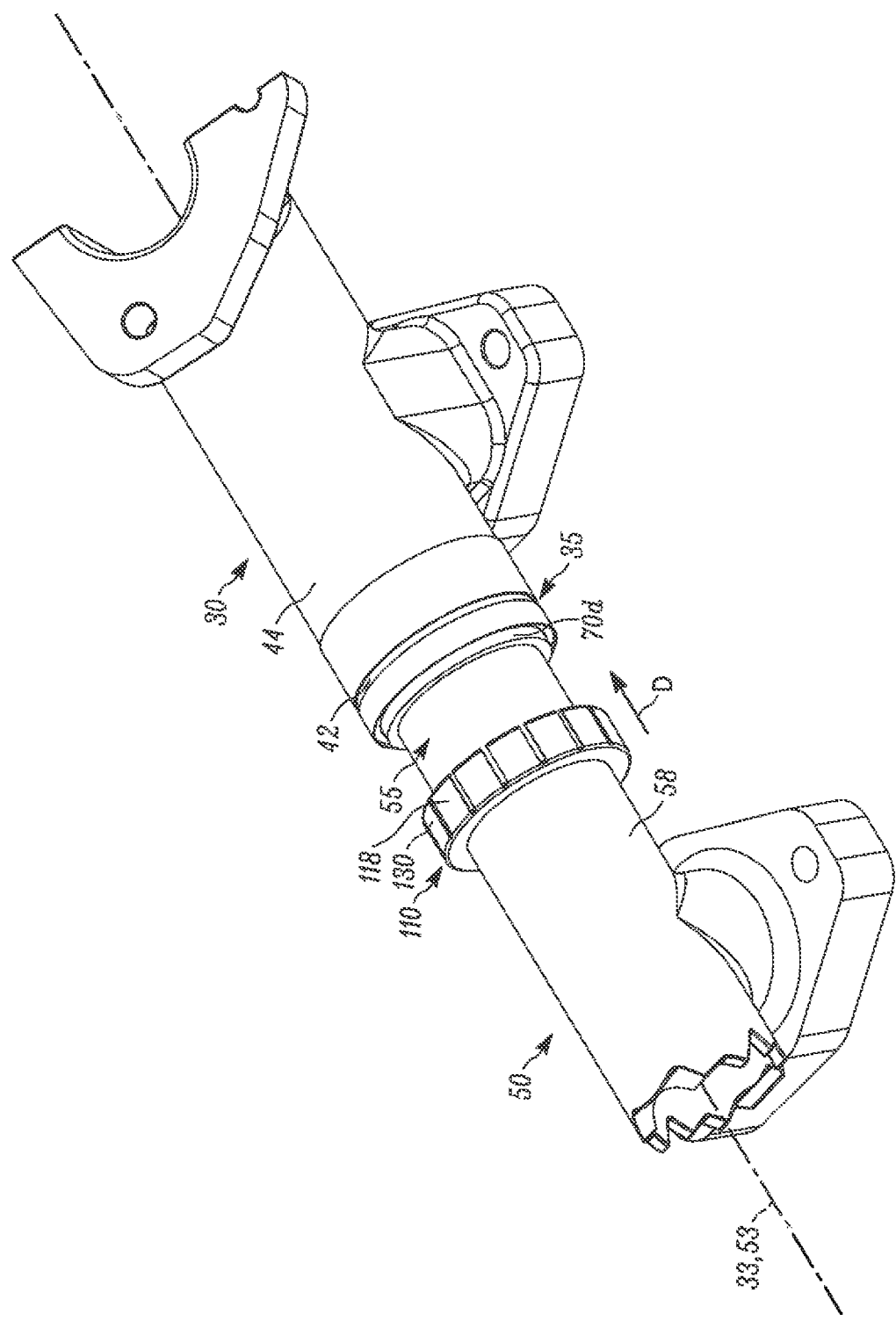
Figure 9:
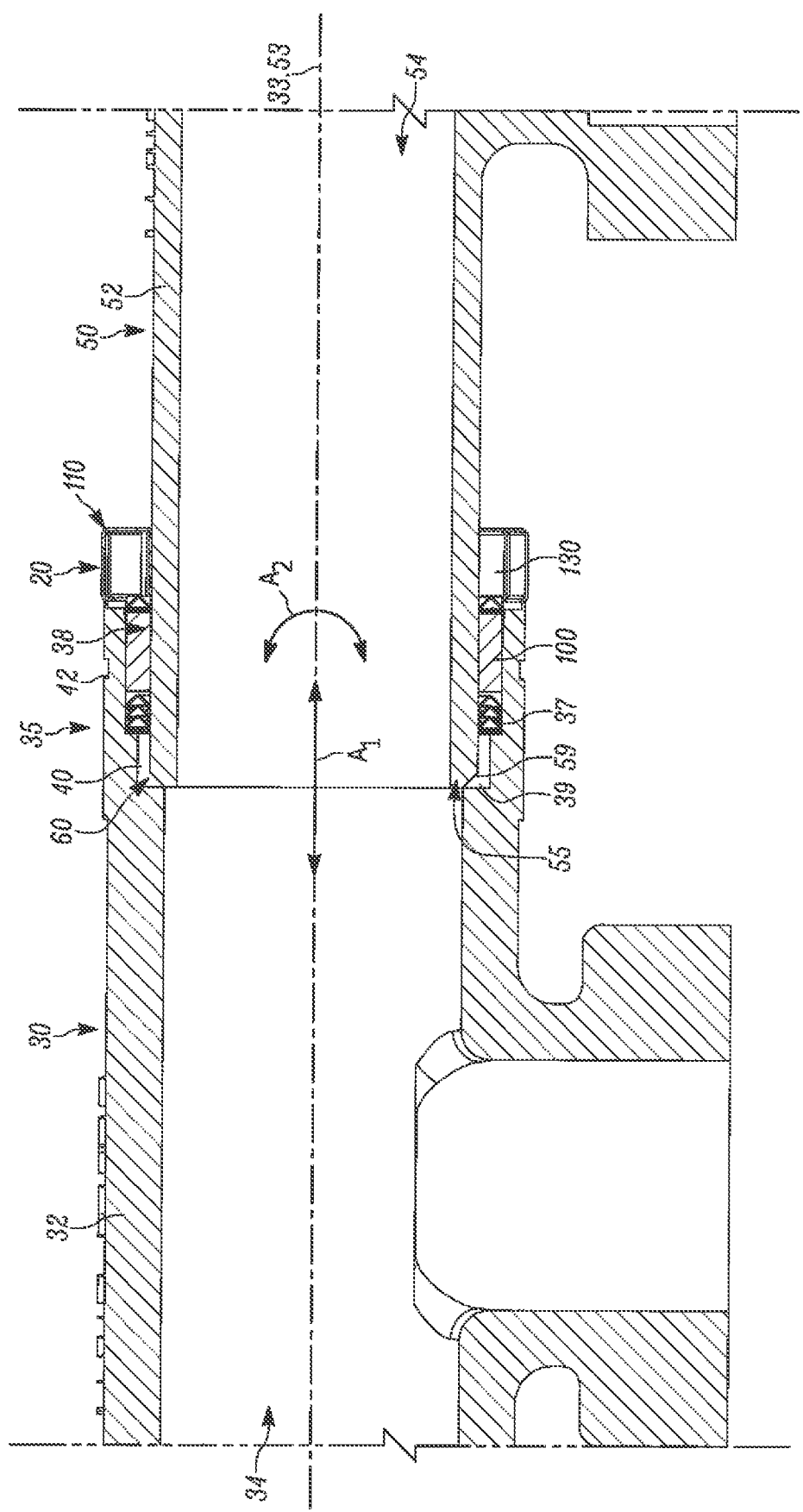
FIG. 9 is a section view of FIG. 1A taken along line 9-9.

The tube 80 is removed from the female manifold 30 and the installation tube 90 placed coaxially with the centerline 33 such that the tube 90 abuts the end 35 of the body 32 adjacent the opening 36 (FIG. 8A). This places the mat 100 in a coaxial relationship with the opening 36. The tube 80 is then inserted into the tube 90 and moved towards the passage 34 to force the mat 100 out of the tube 90 and into the first portion 38 of the opening 36 and abutting the ring 70c (see FIG. 10). The mat 100 is therefore positioned entirely within the first portion 38. The tubes 80, 90 are then removed from the body 32.

The end 55 of the male manifold 50 is extended through the retainer 110 (also see FIG. 3) and sealing member 130. In this position, the base 116 abuts, e.g., frictionally engages, the outer surface 58 of the body 52 and the skirt 116 extends generally towards the opening 56 in the manifold 50. The backing ring 70d is positioned within the interior space 122 abutting the sealing member 130 and the outer surface 58 with the curved projections 78 extending toward the lip 119 on the retainer 110.

Figure 10:
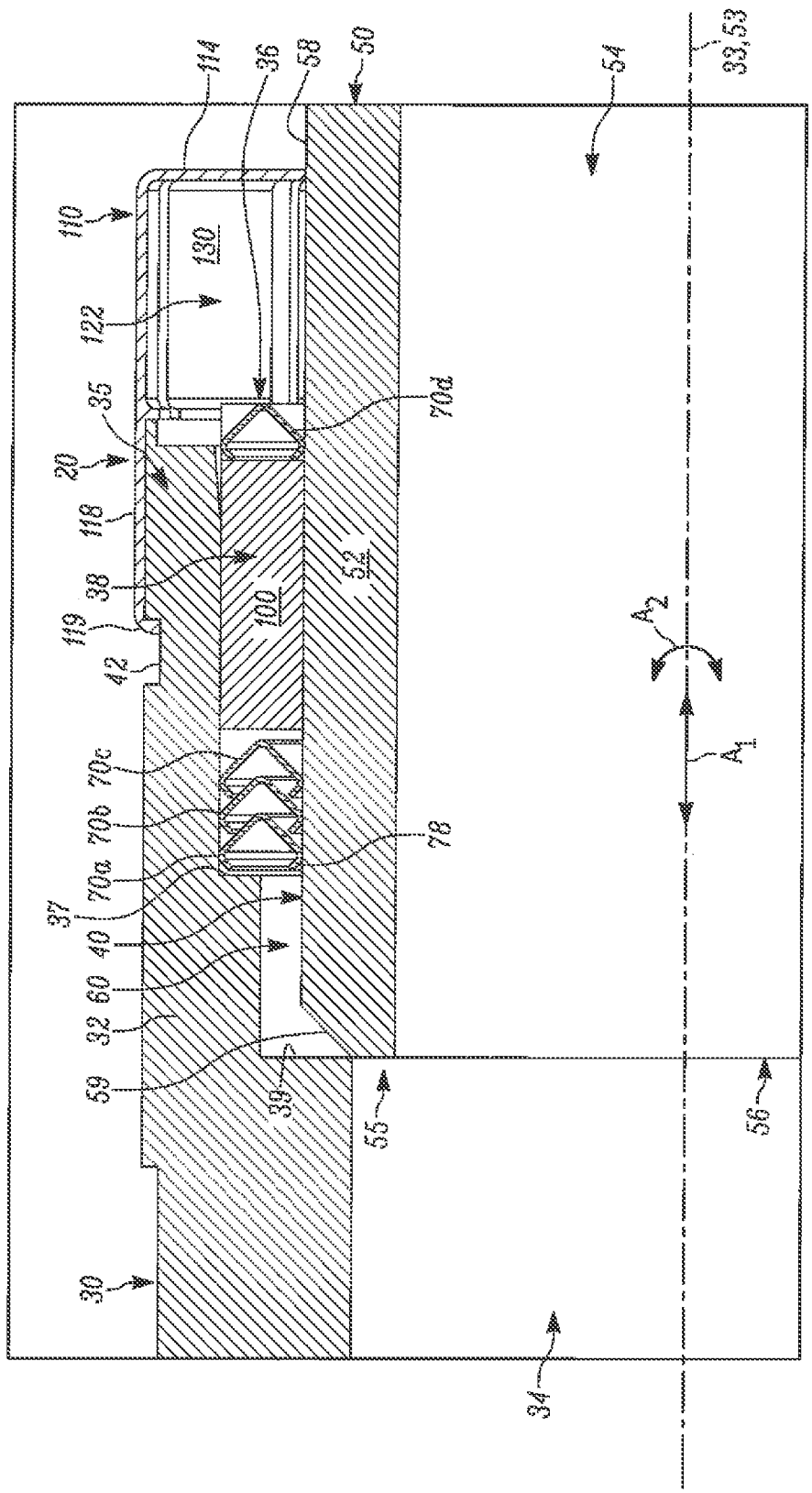
FIG. 10 is an enlarged view of a portion of FIG. 9.

The manifolds 30, 50 are then brought together with their centerlines 33, 53 aligned to allow the end 55 of the manifold 50 to be inserted into the end 35 of the manifold 30 until the manifolds longitudinally overlap and engage one another at a contact surface 59 within the female manifold (see FIGS. 9-10). This forms a gap 60 between the ends 35, 55 of the manifolds 30, 50, which can be annular in shape. The ring 70d is slid in the direction D into the gap 60 until it abuts the mat 100. The retainer 110 is then slid along the outer surface 58 in the direction D.

When this occurs, the retainer 110, with the sealing member 130 disposed therein, eventually engages and slides along the outer surface 44 of the body 32 until the lips 119 on the retainer snap onto the annular recess 42 in the body 32, as shown in FIG. 10. During the insertion, the outer surface 58 of the body 52 slides along the backing rings 70a-70c and mat 100 until the end 55 of the body 52 abuts the contact surface 59 on the body 32.

The backing rings 70a-70d, mat 100, and sealing member 130 all become aligned with and engage one another in a compressed manner such that the sealing member and the mat are axially loaded. As a result, the mat 100 and sealing member 130 are longitudinally held in place and prevented from being extruded out of the gap 60 due assembly and operation of the manifolds 30, 50. The sealing member 130 is compressed between the backing ring 70d and retainer 110 so as to provide an advantageous seal to the device. To this end, the backing ring 70d may become indented in, i.e., deform, the sealing member 130.

The legs 76 of each backing ring 70a-70c are urged towards one another between the bodies 32, 52, thereby elastically deforming the backing rings to a biased/stressed condition providing a degree of resistance to relative movement between the bodies 32, 52. It will be appreciated that when the sealing member 130 is omitted the retainer 110 directly engages the backing ring 70d (not shown).

The manifolds 30, 50 are configured to transfer exhaust gases from an engine to the exhaust pipe (not shown). The sealing device 20 of the present invention advantageously seals the interface between manifolds 30, 50 while allowing for relative movement between the manifolds as would normally occur during vehicle operation. Absent the sealing device 20, the interface between the manifolds 30, 50 could leak, releasing exhaust gases, soot, heat, etc. from the passages 34, 54 to the area surrounding the manifolds. This can cause particle buildup on the exterior of the manifolds 30, 50, weaken the interface and/or reduce performance.

During operation, fluid such as fuel, hot exhaust gases, etc. flow through the passages 34, 54 in the manifolds 30, 50 (not shown). The connection/interface between the manifolds 30, 50 is subjected to heat and vibration during operation, thereby causing the manifolds to move relative to one another. The sealing device 20 of the present invention is advantageous in that it maintains a seal while allowing for both relative longitudinal movement $A_1$ and relative tilting/rotational movement $A_2$ between the manifolds (see FIGS. 9-10). To this end, the flexible nature of the mat 100 and sealing member 130 allow these components to be deformed in multiple directions without plastically deforming or losing functionality. The spring-like construction of the backing rings 70a-70d similarly allows for deformation of the rings while keeping the mat 100 and sealing member 130 in place. Furthermore, the curved projections 78 on the rings 70 provide radiused contact between the rings and bodies 32, 52. This advantageously helps increase component life and help assure uniform contact between the rings 70a-70d and bodies 32, 52.

The sealing device 20 also helps to prevent soot and fuel from passing through the gap 60 to the surroundings to thereby mitigate undesired emissions from the manifolds. To this end, the rings 70a-70d expand under thermal stress at a greater rate than the manifolds 30, 50 and, thus, the contact pressure between the expanding rings and manifolds increases during warm-up and operation. This configuration helps maintain a tight connection between the device 20 and the manifolds 30, 50 during relative movement therebetween.

It will be appreciated that the device 20 can function as a fluid-tight seal between the manifolds 30, 50 or selectively prevent some fluids from exiting through the manifold interface/gap 60 while allowing other fluids to pass through the gap. In other words, the device 20 can act as a seal and/or filter for fluids flowing through the manifolds 30, 50. More specifically, the sealing member 130 and/or mat 100 can act to prevent any soot/slobber from passing through the gap 60 (which could contaminate the engine bay) but allow some gasses, e.g., clean gasses, to pass through the gap. In any case, the device 20 maintains its functionality while allowing for relative movement between the manifolds 30, 50.

Figure 11:
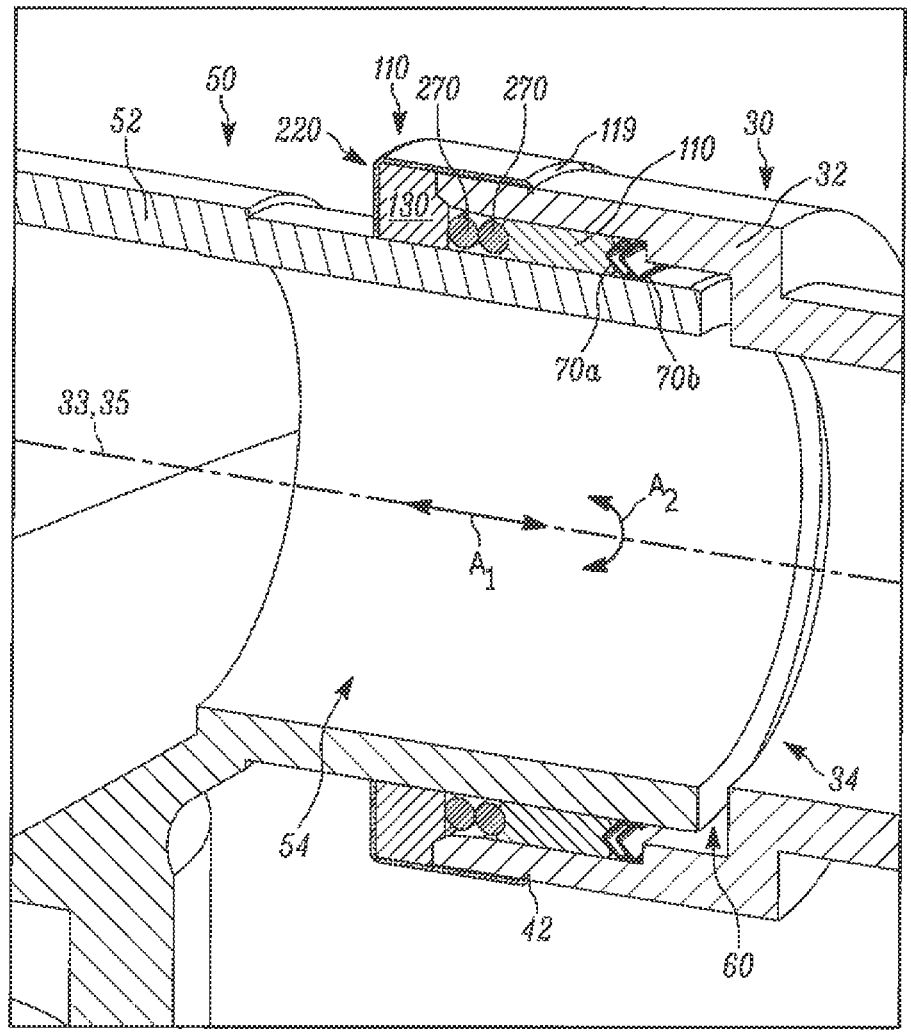
FIG. 11 is a partial section view of another example sealing device.
Figure 12A:
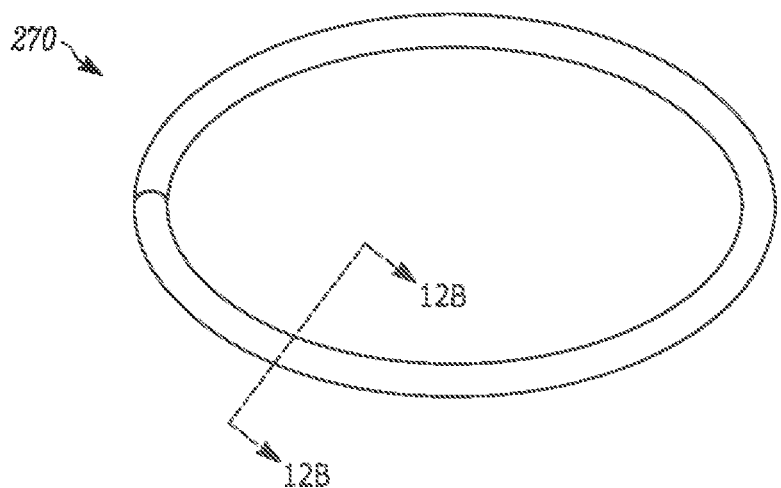
FIG. 12A is an isometric view of another example backing ring used in the sealing device of FIG. 11.
Figure 12B:
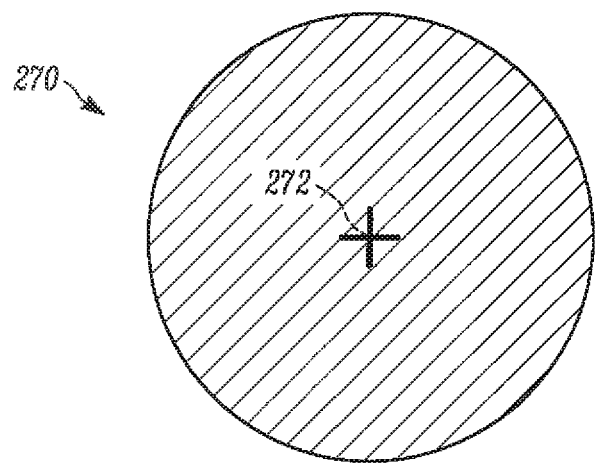
FIG. 12B is section view of the backing ring of FIG. 12A taken along line 5-5.

FIGS. 11-12B illustrate another example device 220 in accordance with the present invention. In the device 220, one or more of the backing rings 70 are used in combination with one or more backing rings 270. Referring to FIGS. 12A-12B, the backing rings 270 having a circular, e.g., solid or hollow, cross-section along the centerline 272. The rings 270 are made of a durable, rigid material such as stainless steel, e.g., 300 series stainless steel, and have a diameter of about 0.125". In any case, the rings 270 are formed from a material that expands at a greater rate under thermal load than the material of the manifolds 30, 50 expands.

As shown in FIG. 11, a pair of backing rings 270 can be positioned axially between the sealing member 130 and the mat 110 on a side of the mat opposite a pair of the backing rings 70a-70d. The backing rings 270 function in the same manner as the backing rings 70 in that they help compress the sealing member 130 and the mat 110 and hold the same in place with the device 220. It will be appreciated that any combination of backing rings 70, 270 (including only backing rings 70 or only backing rings 270) can be used in the sealing device of the present invention to position and compress the sealing member 130 and the mat 110.

Example

The joint device was installed in a test manifold that allowed heated air and soot to be injected through the manifold components and therefore through the device. The joint device used 300 series stainless steel for the backing rings and retainer. The sealing member and mat were each formed from flexible ceramic. The test stand was configured to simulate slip joint movement between the manifold components while being pressurized at elevated temperatures. During testing, the joint was injected with soot or fuel and moved 0.040" linearly and 2° angularly to simulate engine conditions, i.e., the manifold components were longitudinally and angularly moved relative to one another during testing.

Soot Leakage Testing

For this test the manifold skin temperature was elevated to a range from 800°-1000° F. The exhaust gas temperature ranged from 1200°-1600° F. The internal manifold pressure was about 100 psi and the testing lasted over 500 hours, including over 800 mechanical cycles.

Fuel/Slobber Leakage Testing

For this test the exhaust gas temperature ranged from 300°-450° F. The internal manifold pressure was about 45 psi and the testing lasted over 100 hours, including over 100 mechanical cycles.

Results

In both tests, there was no evidence of soot of fuel on the exterior of the joint device or manifold component exterior. This was confirmed by placing a foil wrap around the joint device where leakage can occur. The foil wrap, once removed following testing, displayed no indications of soot or fuel. Moreover, there was no evidence of soot or fuel across the joint device/manifold interface or on the manifold sections. Wear on the joint device components appeared to be negligible.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A sealing device for an exhaust manifold in a vehicle having longitudinally overlapping first and second components separated by a gap, comprising:
  a plurality of backing rings configured for positioning in the gap between the first and second components, each of the backing rings including at least one curved projection with the projections of the backing rings being oriented in the same direction as one another;

an intumescent mat positioned between and abutting the backing rings; and a retainer configured for connecting to the first and second components and configured for covering the gap to prevent the backing rings and mat from exiting the gap while allowing for relative longitudinal and rotational movement between the first and second components.

2. The sealing device according to claim 1, wherein the backing rings cooperate to prevent extrusion of the mat out of the gap.

3. The sealing device according to claim 1 further comprising a sealing member positioned within the retainer for preventing soot from passing through the gap.

4. The sealing device according to claim 3, wherein the sealing member comprises flexible ceramic.

5. The sealing device according to claim 3, wherein the mat and the sealing member are axially loaded.

6. The sealing device according to claim 1, wherein the backing rings are formed from a material having a greater thermal expansion rate than thermal expansion rates of both materials of the first and second components.

7. The sealing device according to claim 1, wherein the backing rings comprise stainless steel.

8. The sealing device according to claim 1, wherein the intumescent mat comprises flexible ceramic.

9. The sealing device according to claim 1, wherein the plurality of backing rings comprises:
 a first backing ring engaging a first side of the mat and positioned within the retainer; and
 at least one second backing ring engaging a second side of the mat opposite the first side for positioning longitudinally between the mat and the first component.

10. The sealing device according to claim 9, wherein the at least one second backing ring comprises a plurality of second backing rings nested within one another.

11. The sealing device according to claim 1, wherein the backing rings are configured for biased engagement with the first and second components.

12. The sealing device according to claim 1, wherein each backing ring comprises:
 a base extending along a centerline; and
 a pair of legs extending from the base on opposite sides of the centerline and diverging away from one another, the base and legs cooperating to define an interior space.

13. The sealing device according to claim 12, wherein at least one curved projection is provided at an end of each leg extending towards the centerline, each curved projection being configured for engaging one of the first and second components to prevent relative movement therebetween.

14. The sealing device according to claim 1, wherein the retaining ring is configured to extend around an end of the second component and includes a lip configured to form a snap-fit connection with a recess in an end of the first component.

15. A sealing device for an exhaust manifold in a vehicle having mating first and second components, comprising:
 a plurality of backing rings configured for positioning in an opening in the first component and being configured for biased engagement with the first and second components;
 an intumescent, compressed mat positioned between and abutting the backing rings;
 a retainer configured to extend around an end of the first component defining the opening and configured to form a snap-fit connection with an end of the second component; and
 a sealing member positioned within the retainer and abutting one of the backing rings for preventing soot from passing through the gap, the sealing device allowing for relative longitudinal and rotational movement between the first and second components.

16. The sealing device according to claim 15, wherein the sealing member comprises flexible ceramic.

17. The sealing device according to claim 15, wherein the backing rings are formed from a material having a greater thermal expansion rate than thermal expansion rates of both materials of the first and second components.

18. The sealing device according to claim 15, wherein the backing rings comprise stainless steel.

19. The sealing device according to claim 15, wherein the intumescent mat comprises flexible ceramic.

20. The sealing device according to claim 15, wherein the plurality of backing rings comprises:
 a first backing ring engaging a first side of the mat and positioned within the retainer; and
 at least one second backing ring engaging a second side of the mat opposite the first side for positioning longitudinally between the mat and the first component.

21. The sealing device according to claim 15, wherein the plurality of backing rings comprises:
 a first backing ring engaging a first side of the mat and positioned within the retainer; and
 a plurality second backing rings engaging a second side of the mat opposite the first side and positioned longitudinally between the mat and the first component, the second backing rings being nested within one another.

22. The sealing device according to claim 15, wherein each backing ring comprises:
 a base extending along a centerline; and
 a pair of legs extending from the base on opposite sides of the centerline and diverging away from one another, the base and legs cooperating to define an interior space.

23. The sealing device according to claim 1, wherein all projections on all the backing rings point in the same direction.

24. The sealing device according to claim 23, wherein the projections point away from the retainer.

* * * * *